United States Patent Office 3,421,130
Patented Jan. 7, 1969

3,421,130
FUSE AND DISCONNECT DEVICE FOR MOUNT-
ING INSIDE A HIGH VOLTAGE BUSHING
Merrill G. Leonard, Brookfield Township, Fowler County,
Ohio, and Leonard L. Wright, Sharon, Pa., assignors to
Westinghouse Electric Corporation, Pittsburgh, Pa., a
corporation of Pennsylvania
Filed Oct. 12, 1964, Ser. No. 403,105
U.S. Cl. 337—157                                    22 Claims
Int. Cl. H01h 71/20; 73/24

ABSTRACT OF THE DISCLOSURE

A combination fuse and disconnect device wherein the removal of a pin releases a tensioned spring to snap the fuse and open the circuit. Another embodiment utilizes a latch which when unlatched provides for breaking the fuse wire. A further embodiment utilizes a key to release the tubular structure containing the fusible element.

---

This invention relates to combination fuse and disconnect devices, and more particularly to a combination fuse and disconnect device suitable for mounting inside a high voltage bushing.

It is frequently desirable in connection with electrical equipment to control the circuit either manually or automatically, such for example as the circuit of a pad mounted transformer. Heretofore, it has been the usual practice to utilize a switch or circuit breaker, and to provide a fuse separate from the switch or circuit breaker and mounted in a suitable position with respect to the transformer.

Equipment embodying our invention offers advantages of both economy and convenience over the aforedescribed prior art apparatus. In summary, our invention includes but is not limited to a high voltage bushing composed of insulating material having a bore therethrough in which is removably mounted a tubular structure which contains a fusible element or fuse wire and a mechanical break device for rupturing the fuse wire when it is desired to open the circuit manually. The bushing at the fuse end is preferably submerged in oil for improved insulation and arc quenching action.

In one embodiment of our invention, the removal of a pin by any convenient means, as by a hook stick, releases a tensioned spring to snap the fuse wire and break the circuit. Thereafter, the tubular structure or inner portion of the disconnect apparatus may be withdrawn from the bushing and a new fuse wire inserted.

In another embodiment, a tube-like structure which contains the fuse is inserted in the inner bore of the high voltage bushing, and sequentially operable latches are provided for, when unlatched, releasing a slidable pull rod portion of the structure to provide for breaking the fuse wire, and thereafter releasing the tubular structure which may then be withdrawn from the bushing and a new fuse wire inserted. Reinserting the tubular structure in the bushing makes electrical contact with a contact structure disposed at or mounted on the end of the bushing underneath the oil level.

A further embodiment utilizes a key to release the tubular structure containing the fusible element. The fusible element itself is attached to a pull rod slidably mounted in the tubular structure. Only after the pull rod is moved to a position which would break the fuse wire can the key be used to release the tubular structure. The key is normally mounted in a bore in the wall of the transformer tank; removal of the key from its mount releases gas pressure in the tank resulting from the arc when the circuit is broken at the fuse, and from other causes. Only the specially shaped key provided can be used to release the structure, and the key must be removed from the tank in order to use it.

Still a further embodiment uses a hollow tube to conduct gas from above the oil level in the tank into the tubular structure at a point above the oil level therein. Gas escapes through the inside of the tubular structure by way of an annular space around the pull rod.

Accordingly, a primary object of our invention is to provide a new and improved combination fuse and disconnect device offering advantages over any now existing in the art.

Another object is to provide a new and improved fuse and disconnect device suitable for mounting in the bore of a high voltage bushing.

A further object is to provide a new and improved combination fuse and disconnect device utilizing a coiled tensioned spring which when released snaps the fuse wire and interrupts the circuit.

Still another object is to provide a new and improved combination fuse and disconnect suitable for mounting in a high voltage bushing, in which the fuse wire once broken or burned out may be conveniently replaced.

Sitll a further object is to provide a new and improved combination fuse and disconnect device in which latches are used to prevent the tubular insert in the bushing from being blown out of the bushing as a result of an explosive arc inside a transformer casing.

These and other objects will become more clearly apparent after a study of the following drawings when read in connection with the accompanying specification, in which.

Figures 1, 2:
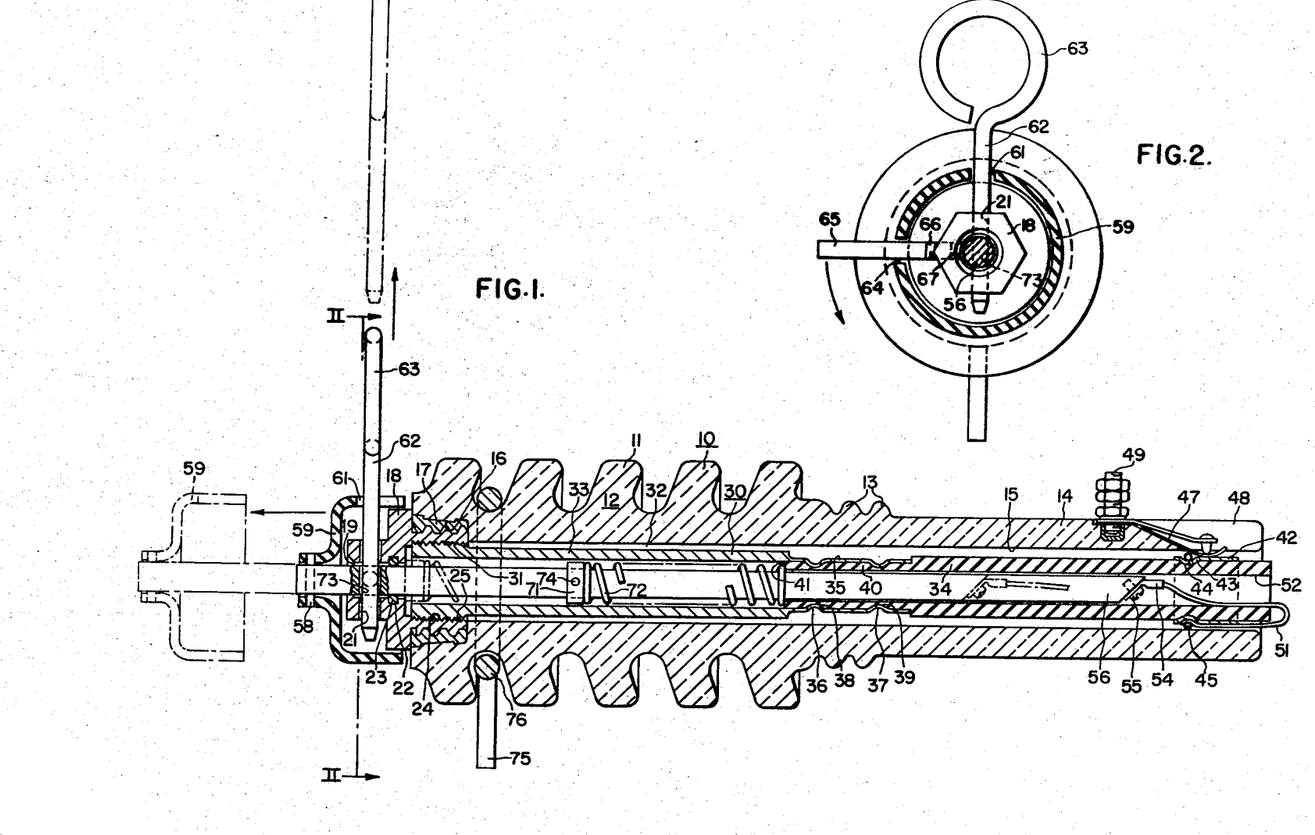
FIGURE 1 is a cross-sectional view of a fuse and disconnect device mounted in a high voltage bushing, according to one embodiment of the invention.
FIG. 2 is a cross-section of the fuse and disconnect of FIG. 1 in a plane containing line II—II of FIG. 1.

Referring now to the drawings, in which like reference numerals are used throughout to designate like parts, for a more detailed understanding of the invention, and in particular to FIG. 1 thereof, the reference numeral 10 designates a bushing composed of insulating material having a series of spaced sheds or skirts 11 on the exterior portion 12 thereof, having threads 13 adapted to engage a nut, not shown, for holding the bushing in place in an aperture in a transformer case, and having a portion 14 which extends into the transformer case and beneath the oil level. An axial bore or aperture 15 preferably substantially centrally disposed in the bushing 10 extends the entire length thereof, and has at the outer end a portion of increased diameter 16 having therein an internally threaded collar member 17 as shown. Disposed in the collar 17 located in the aforementioned bore portion of increased diameter in threaded engagement therein is a cap member, sleeve or collar 18 composed of brass or other suitable material, having an axial bore therein designated 19 with its axis in alignment with the axis of the bore 15. The outer end portion of the cap member 18 is hexagonal as seen in FIG. 2, and has a transverse bore 21 therethrough for purposes to become hereinafter more clearly apparent. As seen in FIG. 1, the cap member 18 has an annular recess 22 in which is disposed a sealing ring or gasket 23, and the cap member 18 also has the bore therethrough having a portion of increased diameter 24 with threads 25 as shown.

Disposed inside of the aforementioned bore 15 in the bushing is a tubular structure generally designated 30, having a metallic sleeve portion 33 with a threaded end portion 31 at the left-hand end as seen in FIG. 1 in threaded engagement with the threads 25 in the cap member 18. The outer diameter of the tubular structure 30 is such that a small space 32 exists between the outer wall of the tubular structure and the inner wall of the bore 15. This space 32 may be filled with air above a point corresponding approximately to the oil level in the tank, and the lower portion of the space 32 may be filled with oil. It is seen that the tubular structure 30 comprises the aforementioned metallic sleeve portion 33, which may be copper or other suitable material and also comprises a sleeve portion 34 at the inner end thereof which is composed of insulating material, such as fiber or other suitable material. The metallic sleeve portion 33 is seen to have an end 35 of reduced wall thickness to form a spring section having spaced annular detents 36 and 37 therein adapted to extend into adjacent annular recesses 38 and 39 respectively in the portion 40 of the insulating sleeve 34 which is adjacent thereto. The insulating sleeve portion generally designated 34 is thereby securely attached to the conductive sleeve portion 33 so that both portions may be removed together as a unit from bore 15, for reasons which will become hereinafter more clearly apparent. The right-hand end of the insulating tube or sleeve 34 is seen to have a conductive collar 42 disposed thereon near the end thereof, the conductive collar 42 having an annular detent portion 43 adapted to firmly extend into an adjacent annular recess 44 in the outer surface of the insulating sleeve 34. The collar 42 is further retained on the end of the insulating sleeve 34 by the annular resilient retaining ring 45. As the tubular structure generally designated 30 is slipped into the bore 15, the conductive collar 42 makes engagement with a spring contact 47 extending through a slot 48 in the end of the bushing 10, the spring contact 47 being attached to a threaded bolt 49 mounted in the casing, for making an electrical connection thereto. It is seen that connected to the conductive collar 42 and held in place by passing it underneath the spring tensioned retaining ring 45 is a fuse wire 51 which extends along the outside of the insulating tube 34 to the end thereof, whereupon the fuse wire 51 is looped back and extends up the bore or central aperture 52 of the sleeve where it is attached to lug 54 which is attached by screw 55 to the end of a conductive connecting rod 56.

Disposed in the axial aperture 52 inside the tubular structure generally designated 30 is the aforementioned conductive connecting rod 56, which as seen extends from the area where the fuse element 51 is attached thereto through the remainder of the bushing and through the axial bore 19 in cap member 18, the left-hand end of rod 56 as seen in FIG. 1 having attached thereto as by set screw 58 a cap 59 of insulating material, which may be composed of the same material as the bushing 10. The cap 59 has two slots therein spaced 90° from each other around the periphery of the wall portion, one of these slots being shown at 61 and through which passes a pin 62 having a handle or a hook portion 63, FIG. 2. The additional slot 64 is also shown, and it is seen that pin 65 extends through the slot 64, pin 65 having a threaded end 66 in threaded engagement with a threaded transverse bore 67 in the aforementioned cap member 18, FIG. 2.

Connecting rod 56 is seen, FIG. 1, to have a collar 71 formed integrally therewith or retained thereon by set screw 74, and it is seen that a coiled helical spring 72 is disposed around a portion of the rod 56, one end of the spring 72 abutting against collar or flange 71, the other end of the spring 72 abutting against the end 41 of the insulating sleeve portion 34, so that while the rod 56 is in the position shown in solid line, the compressed spring normally tends to force the rod to the left, FIG. 1, and when the pin 62 is removed from the transverse bore 73 in rod 56 by withdrawing it through the transverse bore 21 in cap 18, the force of expansion in spring 72 pushes the rod 56 to the left. Because of the slack in the fuse wire 51 as seen in FIG. 1, the connecting rod and associated parts snap up under the spring drive until the slack is taken up. This results in a jerk on the fuse wire which is much more effective in breaking the wire than a steady pull would be. When the wire breaks, an arc is struck. It will be understood that electrical connection to the outside end of the bushing is normally made by using a "hot line clamp" to attach the end of the cable to the pin 65, FIG. 2. After the circuit is open, this clamp can then be released and moved over to the pin 75 which may be fixedly secured to a ring member 76, disposed in one of the troughs between adjacent sheds, or attached at some lower point on the bushing. This provides a visible break in the circuit, which is required for the safety of the lineman.

Summarizing the embodiment of FIGS. 1 and 2, the equipment consists of a bushing of insulating material which contains a fusible element and mechanical break device for rupturing the fuse wire or element when it is desired to open the circuit manually. The bushing at its lower end is preferably submerged in oil for improved insulation and arc quenching action. When overcurrent conditions exist, the fuse may blow from the combined effect of oil temperature rise and current heating. Extinguishing the arc is facilitated by the fact that the fuse element is underneath the oil level.

For manual interruption of the circuit, the pin 62 may be pulled out by a hook stick, and then the spring 72 pushes the rod 56 outwardly. As aforementioned, slack is provided in the fuse wire 51 so that the rod can move freely for a short distance which is sufficient to give a snap action, and this facilitates positive breakage of the fuse wire. The rod then moves out to its full travel, as shown by the dashed lines of FIG. 1, and the arc thus drawn is extinguished in somewhat the same manner as when blown by overcurrent.

To reload or insert a new fuse wire 51, the cap 18 is screwed out of the collar 17 which is permanently fixed in the bore in the bushing and the structure including the tubular portion 30 and cap 18 is withdrawn from the bore 15 in the bushing, the aforementioned collar member 42 sliding underneath the spring contact 47. After the removable structure has been withdrawn from the bushing, the tubular structure 30 is unscrewed from the cap by disengaging the threads at 25 and 31. If desired to facilitate replacing the fuse wire, insulating sleeve portion 34 may be temporarily detached from conductive sleeve portion 33 of the tubular structure generally designated 30. Thereafter a new fusible element or fuse wire 51 can be attached to the end of the rod 56, and sleeve portions 33 and 34 are rejoined; rod 56 is then reinserted in the assembled tubular structure 30, the threaded end of metallic portion 33 is then screwed into cap 18, rod 56 is pushed in against spring 72 and the pin 62 reinserted into transverse bores 21 and 73 to retain the connecting rod 56 in place against the tension of spring 72. The other end of fuse wire 51 is then hooked over the end of sleeve 34 and secured in electrical connection with collar 42 by passing it underneath spring retaining ring 45. Finally the entire tubular structure is inserted in the bore in the bushing, and cap member 18 is firmly screwed in place in collar member 17 which as aforementioned is permanently seated in enlarged bore portion 16.

If cap 18 is tightly engaged, the cap 59 makes it difficult to unscrew the cap 18 until the fuse is again cleared, that is, the circuit broken by removal of the pin 62.

Figure 3:
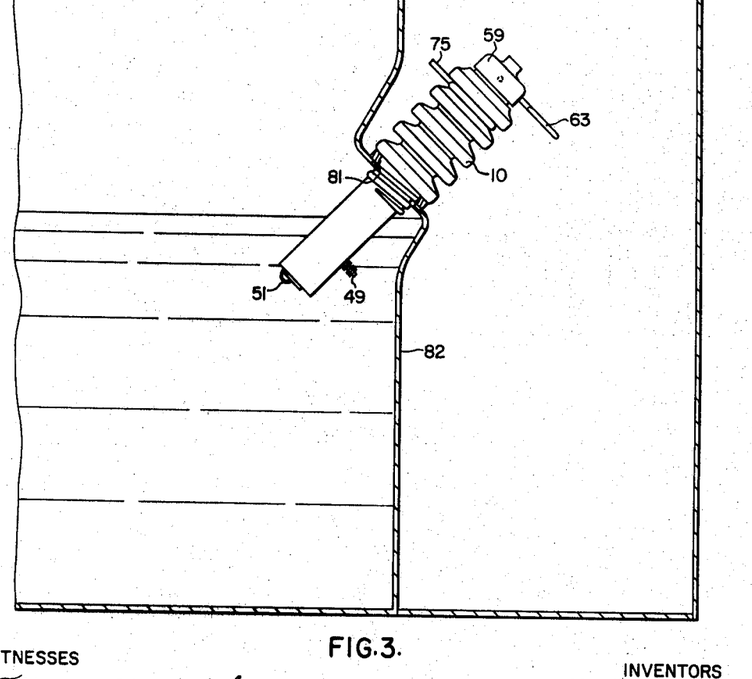
FIG. 3 is a view showing the fuse and disconnect of FIG. 1 mounted in a transformer tank in suitable position therein.

Particular reference is made now to FIG. 3 where the bushing 10 is shown mounted in a bore or aperture 81 in the wall of a transformer tank 82. Preferably, the fuse link is at least four inches below the oil level in the tank or transformer compartment therein.

Figure 4:
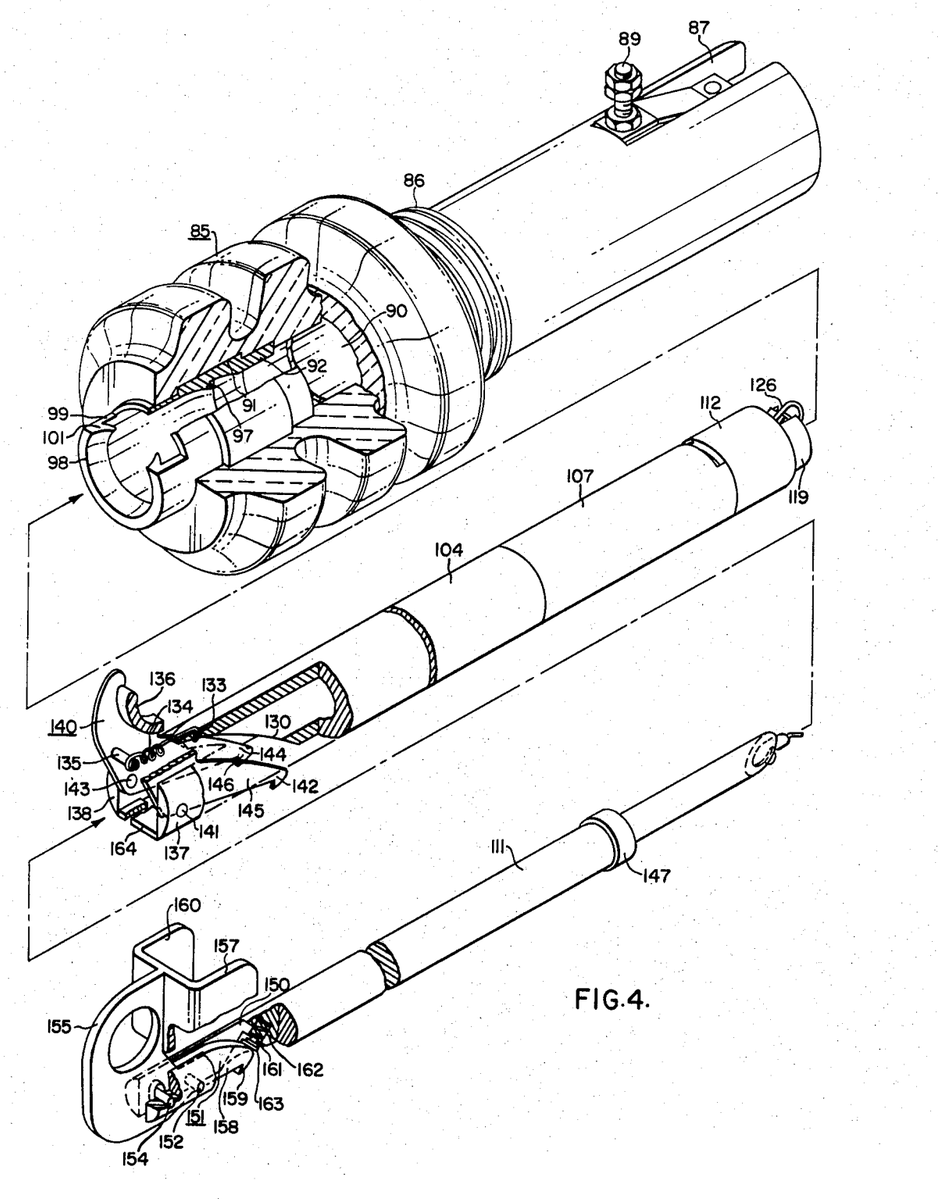
FIG. 4 is a view partially in section and partially in perspective of a fuse and disconnect device, mounted in a high voltage bushing, according to a second embodiment of the invention.

Particular reference is made now to FIGS. 4, 5A, 5B, and 5C wherein an additional embodiment of the invention is shown. The preferred embodiment of FIG. 4 illustrates a fuse and disconnect mounted inside a high voltage bushing in a construction which provides for improved safety in operation. The removable fuse assembly is held in the bushing by spring biased latches on the removable assembly; these latches are forced away from their latching positions by the inner wall of the bore in the bushing as the assembly moves into the bushing, so that it can be thrust into place by single strokes, instead of requiring it to be turned for threaded engagement. Furthermore, for additional safety, a supplemental catch for the hook portion of one of the latches is provided at a point in the travel of the assembly where the fuse wire has been severed but the assembly is still partially in the bushing, to insure that pressure generated by a premature flash or arc at the fuse wire would not drive the assembly out of the bushing. The pull rod to which the fuse wire is attached also has a latch, as will be seen hereinafter.

Figure 5A:
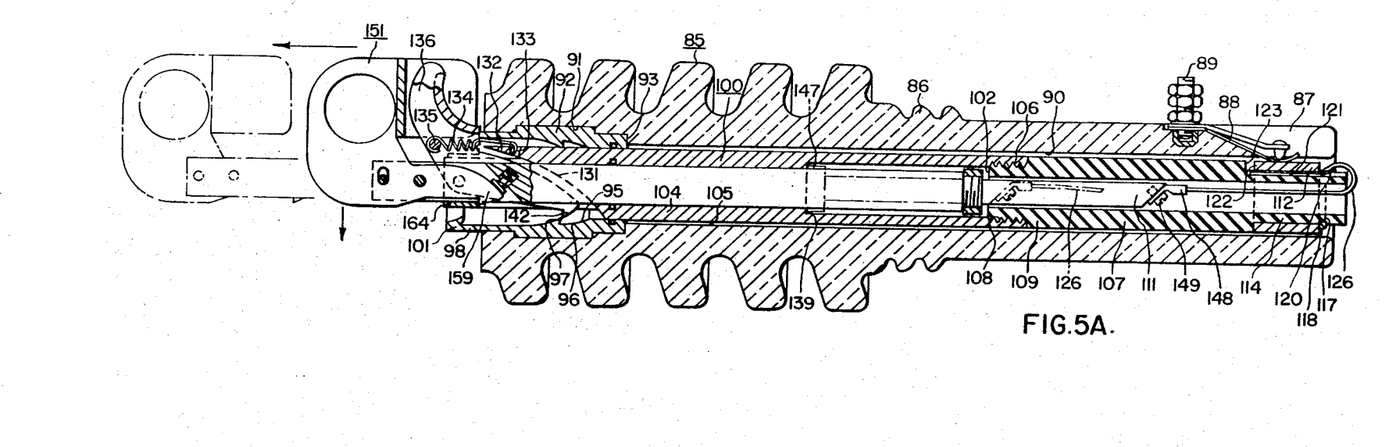
FIGS. 5A, 5B, and 5C are additional views at least partially in cross section of the apparatus of FIG. 4.

In FIG. 5A, to which particular reference is made, the high voltage bushing generally designated 85 has a plurality of spaced sheds or skirts on a portion thereof exterior to the transformer casing. A threaded portion 86 is adapted to cooperate with a nut, not shown, for holding the bushing in the transformer casing, and in the fuse end of the bushing there is a slot 87 through which passes a spring contact member 88 held in position by bolt 89 which also forms a means of making an electrical connection to the spring contact member 88. The bushing 85 has a bore or aperture 90 axially disposed therein and extending the entire length of the bushing, and having a portion of increased diameter 91 at the outside end thereof in which is disposed a metallic bushing or metallic lining 92 permanently secured in place therein. The outer diameter of the bushing 92 may be such that the bushing fits snugly in the portion 91 of increased diameter of the bore 90, and is retained therein as by cement, not shown, or the bushing 92 may have an annular ring on the outside thereof and be permanently cast in the bushing 85. The inner end of the bushing 92 abuts against the shoulder 93 formed in the bore 90 in the insulating bushing 85. It is seen, FIG. 5A and others, that the inner wall of the bushing 92 is not smooth or of uniform diameter, but that an annular groove 95 is provided in the inner wall, the groove having a tapering wall portion 96 to provide a rim-like annular catch 97. This extended rim or catch portion 97 is adapted to be engaged by the hook portions 142 and 146 of a latch member generally designated 140 mounted on or in metallic sleeve portion 104 of the removable tubular structure 100, for reasons which will become hereinafter more clearly apparent. It is seen that the exterior end 98 of the interior metal bushing 92 extends beyond the adjacent end of the high voltage bushing of insulating material 85, that the extended end portion 98 has an arcuate slot 99 therein, FIG. 4, and that at the outer end of the bushing 92 there is an additional inwardly extending lip or catch portion 101 which may be formed integrally with the bushing 92 or may be a portion of a metal ring attached to the inner wall of the metal bushing at the end thereof in any convenient manner as by screws, not shown. The catch or lip portion 101 may extend around all that portion of the inner periphery of the central aperture of bushing 92 which does not have slot 99 therein. This additional overhanging lip portion 101 is adapted to be engaged by the same aforementioned hooks 142 and 146 on arms 145 and 144 of latch generally designated 140 if gas pressure within a casing tends to force the tubular structure out of the bushing prematurely. Catch or lip portion 101 accordingly provides a second or safety catch.

The aforementioned tubular structure generally designated 100, which is removable by twice releasing the two hooks 142 and 146, first from engaging catch or lip portion 97, and thereafter from engaging catch or lip portion 101, includes the aforementioned metallic cylinder or sleeve portion 104. The outer diameter of the metallic sleeve 104 is slightly less than the diameter of the aforementioned bore or aperture 90 axially located in the high voltage bushing 85, so that a small space 105 exists between the outer wall of the metallic sleeve 104 and the inner wall of the bore in the bushing to provide freedom of movement between the bushing and the sleeve, this space 105 being filled by air, or partially by oil, since it is contemplated that the inner end of the bushing 85 will extend below the oil level in a transformer tank or casing.

The right-hand end of the metallic sleeve 104 is seen to be threaded at 106 on the internal surface thereof, and attached to the threaded end of the metallic sleeve 104 is a sleeve 107 composed of insulating material, such as fiber or other suitable material, having an end of reduced diameter 109 with threads 108 thereof engaging the threads 106. The insulating sleeve portion 107 has an inner diameter somewhat smaller than the inner diameter of the conductive portion 104 to form a shoulder 102 against which abuts a collar 147 attached to connecting rod 111 and which stops the rod when it has reached the desired limit of its travel, but the inner diameter of the insulating portion 107 is sufficiently great to permit the free passage of a connecting rod 111 until the shoulder is reached. Near the end of the insulating sleeve 107 there is a portion of reduced outer diameter 114 upon which is mounted a collar 112 of conductive material. Adjacent the outer end of the conductive collar 112 is an annular groove 117 in the insulating tube or sleeve portion 114 in which there is disposed a semiring-like retaining member 118 which holds the collar 112 on the tube. It is seen that the insulating tube has a groove or a slot 119, FIG. 4, extending the length of the portion of reduced diameter along the outside thereof, the groove passing underneath the aforementioned collar and extending a small distance beyond the collar adjacent the inner side thereof. Disposed in this groove 119 is a spring like retaining member 120 to which the fuse wire 126 is electrically connected and secured at one end thereof. It is further seen, FIG. 5A, that the conductive collar 112 has a groove 121 extending lengthwise thereof along the inner wall thereof. When the collar 112 is rotated so that the groove 121 in the inner wall of the collar is directly over the groove 119 in the outer wall of the insulating tube or sleeve, the retaining member 120 may be freely slipped from the assembly for the purpose of attaching a fuse wire. It is seen that there is a pin 122 attached to the inner end of the conductive collar, the pin 122 moving in a slot 123 in the adjacent wall of the insulating sleeve, the pin preventing rotation of the collar beyond prescribed limits necessary to loosen the retaining or connecting member 120 when the grooves are in alignment. After member 120 with a fuse wire connected thereto has been inserted in the space formed by aligned slots 119 and 121, the connecting member 120 is tightened in place as the collar 112 is rotated to a clamping position.

The aforementioned conductive portion 104 of the tube or sleeve structure has a portion at the left-hand end, FIG. 5A, cut away to leave a slanting surface 131 forming on one side a lip portion 132 having a small bore 133 therethrough in which is attached one end of a coiled spring 134, the spring having the other end thereof secured to a pin 135 mounted between the spaced arms 144 and 145 of the latch member generally designated 140 having handle portion 136. The cut away portion 130 leaves two relatively thin oppositely disposed wall portions, one of these being shown at 137, FIG. 5B, both wall portions 137 and 138 being shown in FIG. 4, and the latch generally designated 140, having the aforementioned handle portion 136, is pivoted for movement about a pair of oppositely disposed pivot screws 141 and 143 in the aforementioned wall portions 137 and 138 respectively, FIG. 4. The latch arms 145 and 144 have aforementioned hook portions 142 and 146 respectively as shown, and it is seen that in the absence of force applied to handle 136 substantially parallel to the longitudinal axis of the sleeve and in a left hand direction, FIG. 5A, in a manner to unlatch 97–142 and 97–146 tensioned spring 134 causes the hook portions 142 and 146 to first catch on the lip portion 97 as the sleeve 104 is being moved in a left-hand direction in the bore in the high voltage bushing, and that if the latch member is unlatched at 97–142 and 97–146 and the tubular structure 100 continued to be moved to the left, FIG. 5A, thereafter spring 134 causes the hook portions 142 and 146 to be caught and retained by the aforementioned annular catch or lip portion 101 as the tubular structure is moved further to the left in the bushing, unless a force applied to handle 136 unlatches the device, the lip portion 101 providing a safety catch as aforementioned. If desired, the side wall portions 137 and 138 may include additional oppositely disposed screws, not shown, the ends of which move in slots, not shown, in the two latch arms 144 and 145 disposed on either side of the connecting rod 111, the aforementioned last-named screws limiting movement of the latch arms to the desired amount after the tubular structure 100 has been removed from the bushing thereby facilitating replacement of the tubular structure in the bushing after the fuse wire has been replaced in a manner to be made more clearly apparent hereinafter.

Figure 5B:
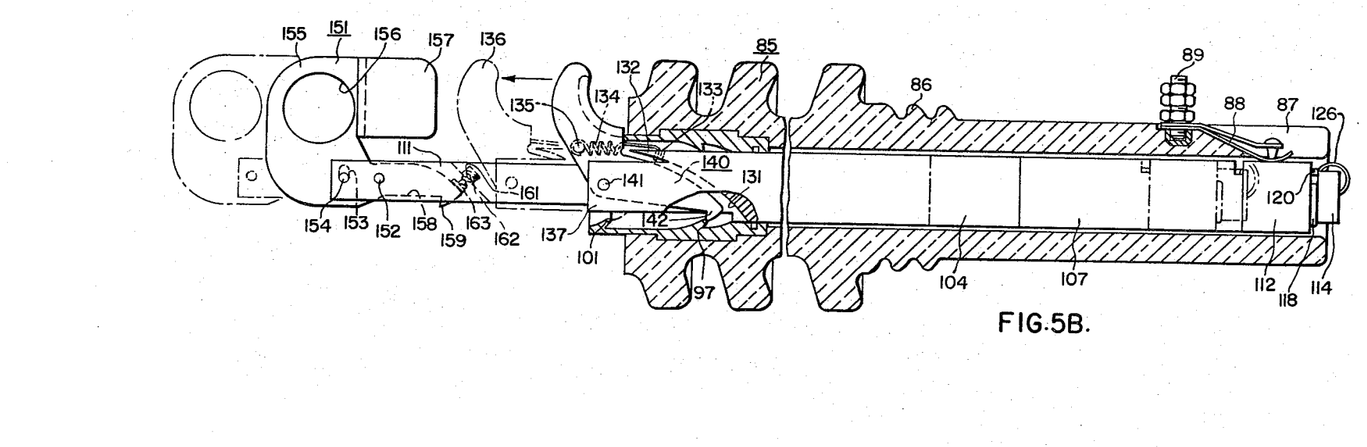
Figure 5C:
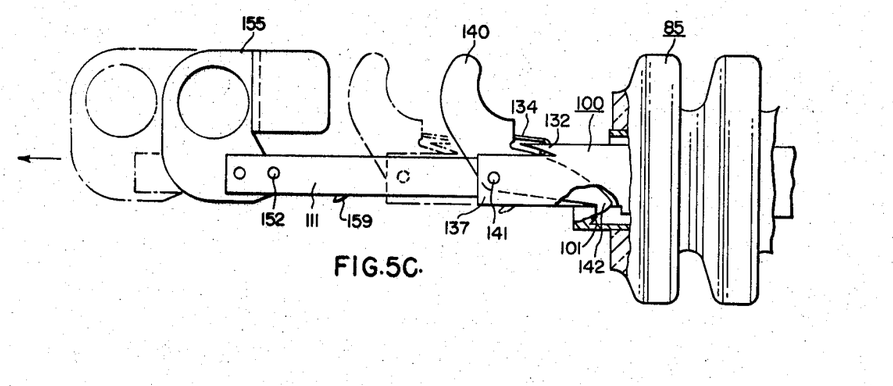

As seen in FIG. 4 and FIG. 5, the connecting rod 111 has the right-hand end thereof of somewhat reduced diameter, the fuse wire 126 being attached thereto by lug 148 and screw 149, and has the left-hand end portion thereof of somewhat greater diameter so that the left-hand portion slides freely through the metallic tube 104 but does not provide for any random freedom of motion therein. The left-hand end of the rod 111 has an axially extending transverse slot 150 cut therein in which is disposed a second latch member generally designated 151; latch member 151 is pivoted for motion about the pivot screw or pin 152, and there is a slot 153 in the latch member, FIG. 5B, through which a motion-limiting screw 154 passes. Latch member 151 has a handle portion 155 having a large circular aperture 156 therein for engagement by a hook stick, and the handle portion has a pair of extended spaced wall portions, these portions being shown and designated 157 and 160, FIG. 4, and which, while the apparatus is in the position shown in solid line in FIG. 5A, extend down and shield the aforementioned latch handle 136 from accidental movement. The hook portion 159 on latch arm 158 of the latch member 151 is normally urged outward or away from the axis of rod 111 by action of a spring 161 seated in a bore 162 in the rod 111, and having adjacent the arm portion 158 a pressure head 163. When the handle portion 155 is pulled in a direction parallel to the longitudinal axis of rod 111, the catch member 151 pivots about pin 152 and the hook portion 159 moves upward, FIGS. 4 and 5B. Until the handle 155 is so moved, the hook portion 159 is pressed outward from rod 111 or pressed down, FIG. 4, by the action of the aforementioned spring 161, and the hook portion 159 catches against and is retained by the rib 164, FIGS. 4 and 5A, extending between the aforementioned wall portions 137 and 138 formed by cutting away a portion of the conductive sleeve 104.

When the apparatus is in the position shown in solid line in FIG. 5A, as aforementioned, the hook portion 159 is engaged by the rib 164 and the connecting rod 111 is retained in position in the bore through the sleeves 104 and 107. FIG. 5 shows in dashed line the condition of the apparatus after the latch member 151 has been pulled outward to the limit of its travel. It is seen that pulling the latch member 151 and rod 111 outwardly or to the left, FIG. 5A, snaps or breaks the fuse wire 126 thereby interrupting the electrical circuit. The motion of rod 111 in this direction may be limited by collar or flange 147 abutting against shoulder 139. Thereafter, the latch member generally designated 140 is operated to unlatch at 142–97 and 146–97 and release the tube 104 and the attached insulating tube 107, which move together to the left in response to hook stick pressure on the handle portion 136.

Assume by way of example that, once the hook portions of latch 140 are disengaged from the catch portion 97, pressure inside the tank, for example pressure resulting from the arc when the fuse wire 126 was broken, causes the rod 111 and tubular structure 100 to be pushed to the left at such a rapid rate that the handle 136 is disengaged from the hook stick. The tension of the spring 134 forces the hook portions 142 and 146 again outwardly so that they are caught by the aforementioned inwardly extending lip portion 101, and a further pull at 136 by the hook stick is necessary to completely disengage the tubular structure 100 so that it may be removed from the interior of the high voltage bushing.

The fuse wire 126 may be then replaced by unscrewing the insulating sleeve portion 107 from metallic sleeve portion 104, and attaching a new fuse wire by lug 148 and screw 149, to pull rod 111, after pull rod 111 has been pushed into the sleeve 104 to the limit of its travel and latched at 159–164. Sleeve portion 107 is then screwed back onto metallic sleeve portion 104, and the outer end of the fuse wire looped around the end portion 114 of sleeve 107, and attached to retaining member 120 which is then clamped in place.

The entire tubular structure 100 may then be thrust back in the bore 90 in the high voltage bushing 85 by a single stroke, hooks 142 and 146 being so shaped that they slide freely along the adjacent wall in that direction. It is important to note that upon inserting the fuse assembly, the latch member 140 engages the first notch 101 of the ratchet formed by 101 and 97 before a contact is established at the inner end of the fuse assembly between the ferrule or collar 112 and the spring contact 88. Thus the tubular structure is locked in before current starts to flow.

Figures 6, 7:
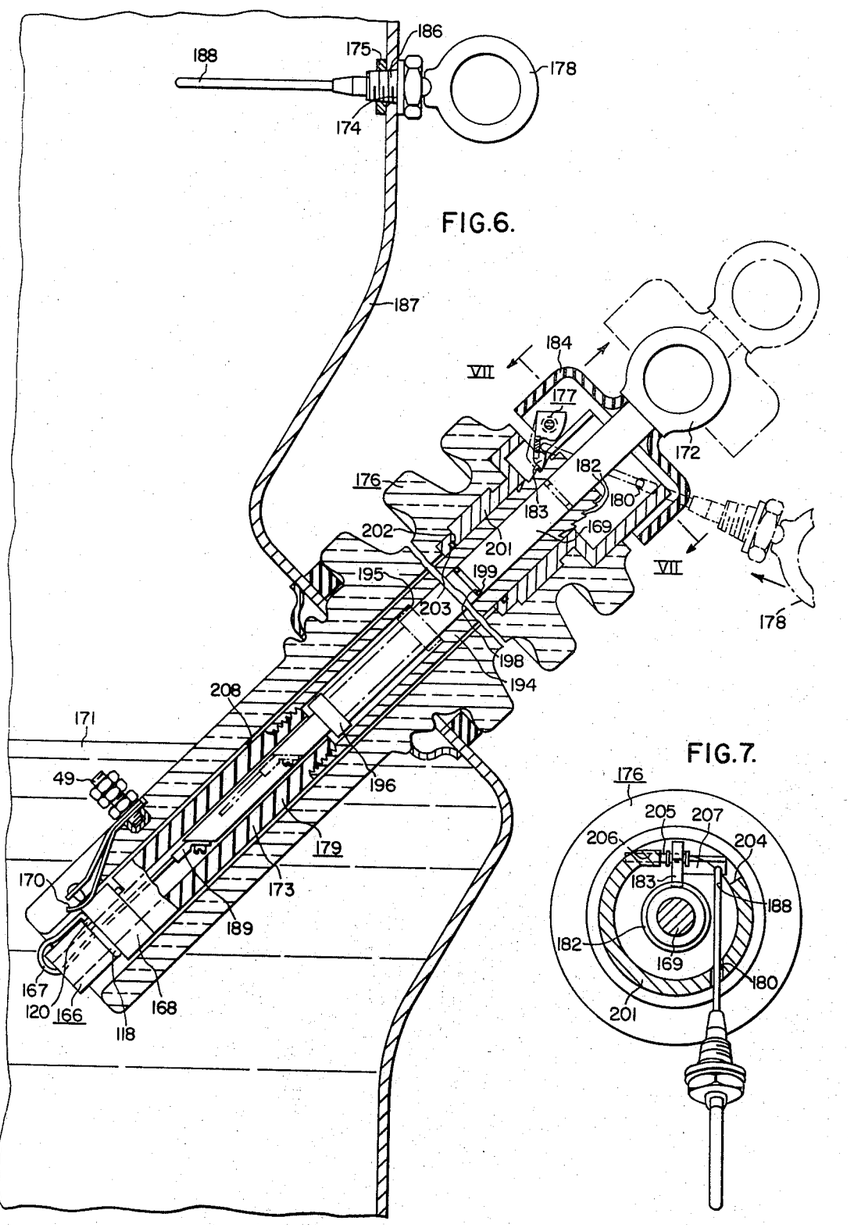
FIG. 6 is a cross-sectional view of a fuse and disconnect device according to a third embodiment of our invention.
FIG. 7 is a cross-sectional view in a plane passing through the line VII—VII of FIG. 6.

Particular reference is made now to FIGS. 6 and 7 wherein an additional embodiment of our invention is shown. As is well known, the arc resultig from blowing of a fuse, and/or previous temperature changes, can build up pressure in a transformer tank or other tank having the bushing mounted in the wall thereof so that if the entire removable portion of a disconnected assembly were withdrawn from the bushing at once, oil would spurt out through the boring in the bushing. To prevent this, we provide a removable tubular structure 179 in which the fuse wire is mounted somewhat similar to the tubular structure of the embodiment of FIGS. 4 and 5, having at the outer end thereof a plurality of axially spaced annular notches 182 to form a ratchet-like cylindrical surface on the outside of the tubular structure, to be engaged by the pawl 183 of a latch member generally designated 177 which is preferably spring loaded. The pawl 183 is adapted to be moved away from the adjacent surface and notches of the tubular structure 179 in response to a force thereon from the end of a key 178 when the key is inserted through an opening 180 in the wall of a metallic bushing 201 permanently secured in the outer end of the high voltage bushing. This can be done only after a cap member 184 secured to the operating rod 169 having hook stick eye 172 has been moved to a position which would break the fuse wire 167 and open the circuit, this position being shown in dashed line in FIG. 6.

The tubular structure generally designated 179 is seen to include an outer sleeve portion of metal 194 which has the aforementioned annular notches or ridges 182 therein, and an inner sleeve portion 173 composed of an insulating material, having the end thereof adjacent portion 194 of reduced diameter and in threaded engagement with threads on the adjacent inner surface of the metallic sleeve 194 to form a tubular structure which may be removed as a unit from the bore in the high voltage bushing. The sleeve portion 194 is seen to have a portion of reduced inner diameter to form a shoulder at 195, against which abuts an annular flange 196 secured to or formed integrally with the operating rod or pull rod 169 while the pull rod is in the position shown in dashed line.

Preferably the operating rod or pull rod 169 has an annular groove 198 therein in which is disposed an O-ring 199 for providing close sealing engagement with the adjacent inner wall of sleeve portion 194. Preferably the aforementioned metallic bushing 201 permanently seated in the outer end of the high voltage bushing 176 has an annular groove 202 on the inside wall surface thereof in which is disposed an O-ring 203 for providing close sealing engagement with the adjacent wall portion of the metallic sleeve 194.

The aforementioned key 178 is normally disposed in a key mount or bushing 186 mounted in a bore 174 in the wall 187 of the same transformer tank which has the high voltage bushing and disconnect disposed therein; the key mount or bushing 186 is held in position in the wall by a nut 175. The key generally designated 178 has a long extended operating end portion 188.

Further details of the latch mechanism generally designated 177 are shown in FIG. 7 to which particular attention is directed. It is seen that the outer end of enlarged diameter of the metallic bushing 201 has a cutaway arcuate shaped portion 204, and that in one wall surface of the cutaway portion a pin 205 is fixed in a bore 206 therein, the pin having pivotally mounted thereon the aforementioned pawl 183. The pawl member 183 is secured to a short arm 207 which extends inward from the pin 205. Spring means, not shown, may be provided for normally forcing the pawl 183 against the annular ridged ratch or ratchet surface of sleeve 194. After opening 180 in bushing 201 has been uncovered by moving rod 169 and cap 184 to the position shown in dashed line, and after the end 188 of the pin or key 178 has been inserted through the opening 180 in the outer end wall portion of bushing 201, the operating end 188 of the key, pressing against the arm 207 moves the pawl 183 away from the ridged surface 182 of the outer end of the sleeve 194 of the tubular structure 179, freeing the structure so that it can be removed, so long as the key is retained in position until the pawl 183 has passed the innermost annular ridge 182.

In summary, in the operation of the apparatus of FIG. 6 and FIG. 7, assume that the apparatus is in the position shown in solid line in FIG. 6 and that the circuit is operating normally, and that thereafter some abnormality occurs in the circuit which makes it desirable to break or open the circuit. The hook 172, or the eye thereof, is grasped and pulled outward to the limit of its travel as provided by aforementioned flange 196 abutting against aforementioned shoulder 195. The fuse wire 167 is broken by this movement, interrupting the electrical circuit as the hook stick and operating or pull rod are moved to the position shown in dashed line. The arc at fuse wire 167 may cause the liberation of gas which collects in the transformer tank. When key 178 is removed from its mounting sleeve 186, gas pressure in the tank is relieved as the gas exits through the opening left by the removal of the key 178. The key is thereatfer inserted in the aforementioned opening 180, and the key end 188 pressing against the arm 207 moves the pawl 183 away from the ridged surface of the metallic sleeve portion 194 whereby the pull rod 169 may be further removed from the bushing, this time carrying with it the entire structure 179 because the flange 196 exerts a force against the shoulder 195. Accordingly, the entire structure generally designated 179 can be removed from the bore in the high voltage bushing 176. The insulating sleeve 173 is thereafter unscrewed from the metallic sleeve portion 194, a new fuse wire 167 is attached to the end of the connecting rod by lug 189, the insulating sleeve 173 is thereafter attached again by threading in the metallic sleeve 194, and the end of the fuse wire 167 looped around the end of sleeve 173 and attached to a metallic collar 168, that is, electrical connection is made, in a manner which may be similar to that shown in connection with FIGS. 5A and 5B, wherein the fuse wire 167 is attached to a long conductive metallic connecting element which is slipped into a groove underneath collar 168 and the collar then rotated to a position which clamps the connecting member, not shown for convenience of illustration, securely in position. Thereafter the entire assembly 179 is reinserted in the bore 208 in the high voltage bushing. It will be seen that during the reinsertion process the pawl member 183 travels readily over the annular ridges 182 which are sloped so as not to impede motion of the assembly 179 as the assembly is thrust into the bore 208 in the high voltage bushing. On inserting the fuse assembly, the pawl 183 engages at least the first ridge 182 of the ratchet before contact is made at the inner end of the fuse assembly between ferrule 168 and spring contact 170, so that the tubular structure is locked in for safety before electrical circuit is made.

Figure 8:
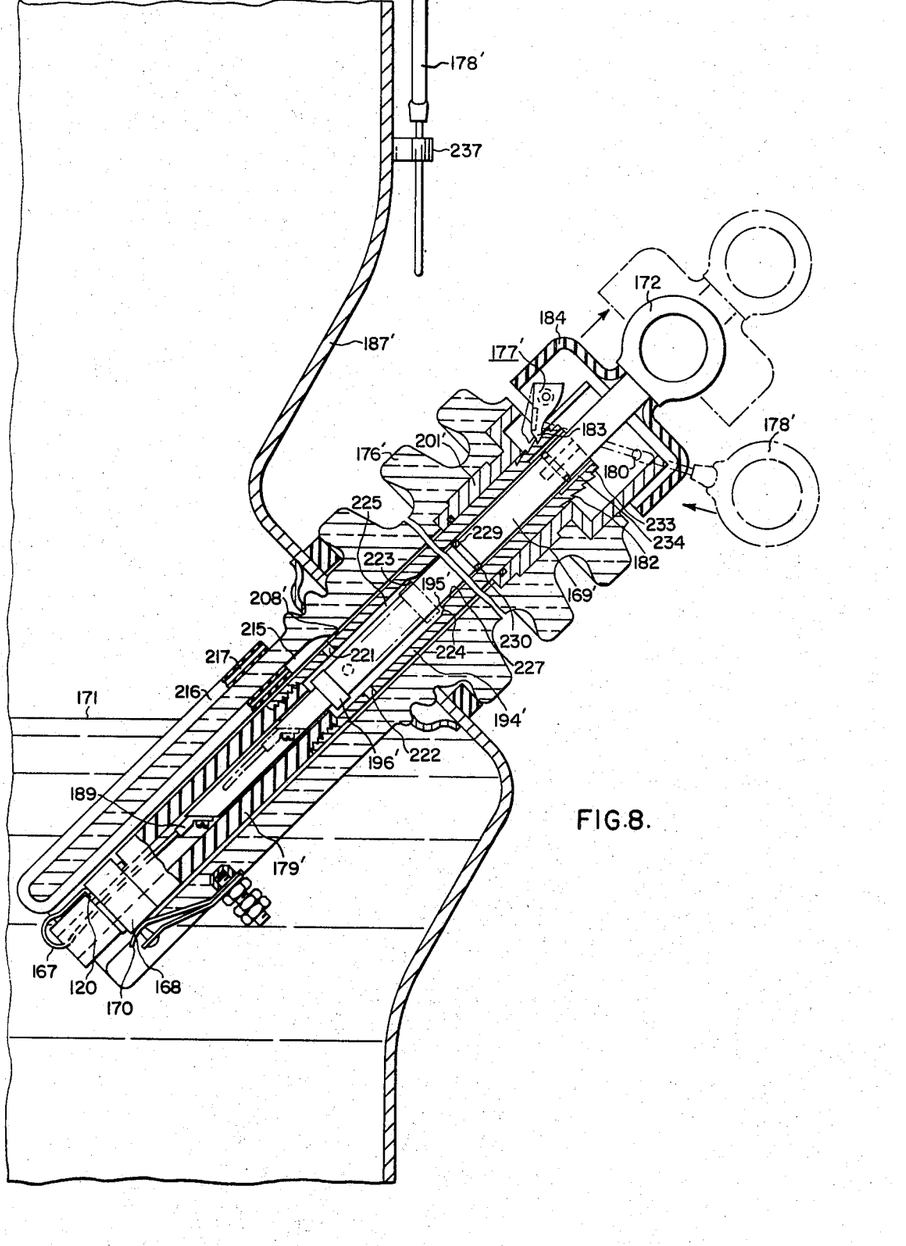
FIG. 8 is a cross-sectional view of fuse and disconnect apparatus according to a fourth embodiment of our invention.

Particular reference is made now to FIG. 8, in which still a further embodiment of our invention is shown. The inner wall of internal bore 208' in the high voltage bushing 176' is seen to have an axially extending groove or slot 215 therein, in which is disposed a hollow tube 216 composed of insulating material, one end of tube 216 being located in the groove 215 above the oil level, the tube extending around the inner end of the bushing 176' and having the other end at a position well above the level of the oil 171 in the tank, the opening in the tube 216 being designated 217. The tube may be secured to the bushing in any convenient manner as by cement. The metallic sleeve portion 194' is seen to have a plurality of radially extending apertures in the wall thereof at spaced intervals around the periphery of the wall, two of these apertures being designated 221 and 222, all of the apertures communicating with annular space 225, at least one or more of the apertures communicating with the groove 215 regardless of the angular position about its own longitudinal axis in which the metallic sleeve 194' is disposed in the high voltage bushing 176'. It is further seen that the annular flange 196' may be of slightly reduced outer diameter if desired to increase the width of the annular space between the outer surface of the flange and the inner wall of sleeve 194', and that the shoulder 195' in metallic sleeve 194' has at spaced intervals therearound a plurality of tapered slots, two of these being shown at 223 and 224, to provide that hydrogen or other gas in the annular space 225 may flow freely through the tapered slots 223 and 224 into the space 227 between the outer surface of pull rod 169' and the inner wall of the metallic sleeve portion 194' when the pull rod 169' is in the position shown in dashed line, that is, when the flange 196' abuts against the shoulder 195' formed when the inner diameter of the metallic sleeve portion 194' changes. The pull rod 169' has an annular groove 229 therein in which O-ring 230 is located. It is seen further that the outer end of the metallic sleeve portion 194' has a cutaway portion of increased inner diameter 233 to provide an enlarged annular space 234. The sleeve portion 194' also has a series of annular ridges 182 around the outside thereof, and the embodiment of FIGURE 8 has a pawl 183 mounted in a manner to be moved away from the adjacent ratch portion of the surface of sleeve 194' by the end of a key 178', normally mounted in the bore of a mount 237 exteriorly attached to the wall 187' of the transformer tank. The latch mechanism 177 and pawl 183 of FIG. 8 may be similar to that of FIGS. 6 and 7.

In the operation of the apparatus of FIG. 8, assume that the circuit is operating normally and that the pull rod 169′ and cap 184 are in the position shown in solid line. Assume thereafter that because of some abnormality it becomes desirable to break or open the electrical circuit. Pull rod eye 172 is grasped, as by a hook stick if desired, and pulled to the position shown in dashed line, carrying with it the operating rod 169′. This results in breaking the fuse wire 167 as the end of the pull rod carrying the connecting lug 189 for the fuse wire is withdrawn to the position shown in dashed line. The arc caused by interrupting the circuit, or other causes, may cause the creation of gas inside the transformer tank, which gas flows through the passageway or opening 217 in insulating tube 216, which as aforementioned has the end above the oil level in the casing, out the end of tube 216 into the axially extending groove 215, thence through at least one of the radially extending bores 221 or 222 into the space 225, thence the gas or air flows past collar or flange 196′ through slots 223 and 224 into the space 227 between the outer surface of the pull rod 169′ and the inner wall of the metallic sleeve 194′. It is seen that the O-ring 229 has now moved to the position shown in dashed line where there is ample space 234 on the outside of the O-ring for the gas from annular space 227 to pass out to atmosphere. Thereafter, after all of the excess gas has been exhausted from the tank, the key 178′ is removed from mount 237 and inserted through hole 180 in the metallic bushing 201′ until the end of the key presses against the arm 207 attached to pawl 183, removing the pawl from the notches 182 so that by grasping the hook stick eye 172 the entire tubular structure 179′ can be removed from the bore in the high voltage bushing. After a new fuse wire is inserted in accordance with the procedure described in connection with FIG. 6, the entire tubular structure may be freely reinserted in the bore in the bushing, passing freely past the pawl 183 for reasons aforedescribed.

If desired in the embodiment of FIG. 8 key 178′ may be dispensed with and latch 177′ manually operated.

The word "conductive" when used herein without a modifier means electrically conductive.

In summary, the apparatus of FIGS. 6, 7 and 8 consists of a combination fuse and disconnect with a tank venting device arranged so that excess pressure will be released before the fuse assembly is completely withdrawn from the high voltage bushing.

Significantly, all embodiments of our invention offer the following advantages:

(1) The entire tubular structure is withdrawn from the outer end of the bushing, making it unnecessary to enter the tank to replace the fuse;

(2) The tubular structure is retained in the bushing by means releasable from outside the bushing;

(3) The tubular structure is not normally withdrawable until after the connecting rod has been withdrawn to a position to break the circuit;

(4) Upon reinserting the tubular structure in the bore in the bushing after a new fuse element has been attached, the electrical circuit is not made until the tubular structure has reached a position where it is locked in.

Whereas the sleeves or tubular structures generally designated 30, 100, 179 and 179′ have been shown and described as being composed only partially of insulating material, and this is a convenient construction, the tubular structures could in some cases be composed entirely of insulating material of sufficient strength and the connecting rod relied on to be the sole current carrier.

Although the invention has been described with respect to a high voltage bushing, other housings composed of insulating material and having elongated bores could be employed.

Whereas we have shown and described our invention with respect to a number of embodiments which give satisfactory results, it should be understood that changes may be made and equivalents substituted without departing from the spirit and scope of the invention.

We claim as our invention:

1. Fuse and disconnect apparatus comprising, in combination, a tubular structure composed at least partially of insulating material adapted to be slidably disposed in a bore in a bushing having contact means at one end thereof, the tubular structure carrying other contact means adapted to make electrical connection with the contact means on the bushing while the tubular structure is in the bore of the bushing, connecting rod means composed of conductive material slidably disposed in the tubular structure and movable from a first position to a second position therein, spring means normally urging the connecting rod means to the second position, manually releasable means normally retaining the connecting rod means in the first position against the force of the spring means, a fuse element extending between the other contact means and the adjacent end of the connecting rod means while the rod means is in the first position, the connecting rod means when the manually releasable means is actuated being moved by the force of said spring means to the second position thereby breaking the fuse element and interrupting the electrical circuit, the connecting rod means including means which engages the tubular structure when the connecting rod means is moved to the second position, and releasable retaining means for retaining the tubular structure within the bore, the retaining means being adapted to be manipulated from outside the bushing to release the tubular structure whereby the tubular structure may be withdrawn with the connecting rod means as a unit by further force applied to the connecting rod means after it has reached said second position within the tubular structure, withdrawal of the tubular structure from the bore in the bushing breaking the electrical connection between the contact means and the other contact means.

2. In fuse and disconnect apparatus in combination, a bushing composed of insulating material, the bushing having an axial bore therethrough and electrical contact means at one end thereof, a tubular structure composed at least partially of insulating material slidably disposed in the bore in the bushing and carrying other contact means which makes electrical connection with the contact means on the bushing while the tubular structure is in the bore in the bushing, connecting rod means composed of conductive material disposed in the tubular structure and movable from a first position to a second position therein, a fuse element extending between the other contact means and the adjacent end of the connecting rod means while the rod means is in the first position, the connecting rod means when moved to the second position breaking the fuse element and interrupting the electrical circuit, means carried by the connecting rod means for preventing further axial movement after the connecting rod means has been moved to the second position, and releasable retaining means for retaining the tubular structure and connecting rod means within the bore, the retaining means being adapted to be manipulated from outside the bushing only after the connecting rod means has moved to the second position to release the tubular structure and permit removal thereof and replacement of the fuse element.

3. In fuse and disconnect apparatus, in combination, a tubular structure composed at least partially of insulating material adapted to be slidably disposed in a bore in a bushing composed of insulating material and having electrical contact means at one end thereof, other contact means carried by the tubular structure adapted to make electrical connection with the contact means on the bushing while the tubular structure is in the bore of the bushing, connecting rod means composed of conductive material slidably disposed in the tubular structure and movable from a first position to a second position therein, manually releasable spring means within the tubular structure normally urging the connecting rod means to the second position, a fuse element extending between the other contact means and the adjacent end of the connecting rod means while the rod means is in the first position, the connecting rod means when moved by the tension of the spring means when released to a position intermediate the first position and the second position breaking the fuse element and interrupting the electrical circuit, the spring means thereafter continuing to move the connecting rod means to the third position thereby elongating the arc caused by breaking the fuse element and tending to extinguish the arc, releasable retaining means for retaining the tubular structure within the bore, the retaining means being adapted to be manipulated from outside the bushing to release the tubular structure, and means carried by the connecting rod means for engaging the tubular structure upon further movement of the connecting rod means to the third position whereby, after the retaining means has been released the rod means and tubular structure may be withdrawn as a unit from the bore in the bushing by force applied to the connecting rod means, withdrawal of the tubular structure breaking the electrical connection between the contact means and the other contact means.

4. Fuse and disconnect apparatus according to claim 2 including means carried by the connecting rod means for preventing release of the retaining means for the tubular structure until the connecting rod means has been moved to the second position.

5. Fuse and disconnect apparatus according to claim 2 in which the releasable retaining means includes means secured to the bushing and means carried by the tubular structure engaging the means on the bushing.

6. Fuse and disconnect apparatus comprising, in combination, a high voltage bushing having a bore extending the length thereof and having electrical contact means mounted on one end thereof, tubular means composed at least partially of insulating material slidably disposed in the bore and extending at least part of the length thereof, other contact means carried by the tubular means engaging the contact means mounted on the bushing when the tubular means is inserted to its maximum penetration in the bore in the bushing, connecting rod means composed of conductive material extending through the tubular means, a fuse element having one end thereof connected to the connecting rod means while the connecting rod means is in a predetermined position within the tubular means and having the other end theerof connected to the other contact means, the connecting rod means being slidable in the tubular means to a position whereat the fuse element is broken thereby interrupting the electrical circuit, and retaining means for the tubular means adapted to be released in response to a force applied external to the tubular means only after the connecting rod means has moved to a position which breaks the fuse element, to thereby permit removal of the tubular means from the bore of the bushing and replacement of the fuse element.

7. Fuse and disconnect apparatus according to claim 3 in which the connecting rod means is additionally characterized as having a transverse bore therein at a predetermined position along the length thereof, and including in addition sleeve means secured to the bushing and having a transverse bore therein in alignment with the bore in the connecting rod means while the connecting rod means is in the first position, and removable holding pin means passing through the transverse bore in the sleeve means and the transverse bore in the connecting rod means, removal of the pin means releasing the spring means.

8. Fuse and disconnect apparatus comprising, in combination, a high voltage bushing having a bore therein extending the length thereof, contact means carried by the bushing near one end thereof and adapted to be connected in an electrical circuit, a tubular structure composed at least partially of insulating material removably disposed in the bore in the bushing, other contact means carried by the tubular structure at the end thereof adjacent the contact means on the bushing and making electrical connection with the contact means on the bushing, a pull rod composed of conductive material slidably disposed in the tubular structure, the pull rod forming part of the electrical circuit through the fuse and disconnect apparatus, a fuse wire having one end thereof connected to the pull rod and the other end thereof connected to the other contact means carried by the tubular structure, spring means normally urging the pull rod outside of the tubular structure, and means normally retaining the pull rod in the tubular structure against the force of the spring means, said retaining means being adapted to be actuated to release the pull rod whereupon the spring means forces the pull rod to a position whereat the fuse wire is broken and the electrical circuit interrupted, removal thereafter of the tubular structure from the bore in the bushing to replace the fuse wire resulting in breaking the electrical connection between the contact means and said other contact means whereby potential is removed from the tubular structure.

9. A fuse and disconnect device comprising, in combination, sleeve means adapted to be inserted in a bore in a bushing composed of insulating material and having contact means at one end thereof, the sleeve means being inserted from the other end of the bushing, the sleeve means having at least a portion thereof adjacent the contact means composed of insulating material, a collar of conductive material mounted on the outside surface of the insulating portion of the sleeve means adapted to make electrical contact with the contact means on the bushing, the end of the sleeve means at the other end of the bushing being externally threaded, internally threaded collar means adapted to be mounted in the bore in the bushing at the outer end thereof, the threads of the collar means engaging the threads in the sleeve means while the sleeve means is mounted in the bore in the bushing and retaining the sleeve means therein, a rod of conductive material slidably disposed inside said sleeve means, the rod extending beyond the threaded end of the sleeve means and being adapted to have an electrical connection made thereto, the rod having a collar at a predetermined position thereon, the sleeve means including means forming a shoulder on the inside wall thereof, a spring disposed around the rod between the shoulder and the collar, the spring being normally compressed while the rod is inserted in the sleeve means and normally urging the rod to move within the sleeve means toward the threaded end of the sleeve means, a fuse wire having one end thereof connected to the rod and one end thereof connected to the collar of conductive material mounted on the insulating portion of the sleeve means, and removable means disposed at the internally threaded collar means normally retaining the rod in position in the sleeve means against the tension of the spring, the withdrawal of the removable means releasing the rod whereupon the spring forces the rod of conductive material in a direction to break the fuse wire and interrupt the electrical circuit.

10. Fuse and disconnect apparatus comprising, in combination, a tubular structure having at least a portion thereof composed of insulating material and adapted to be slidably disposed in a bore in a bushing having resilient contact means mounted on one end thereof, other contact means disposed at one end of the tubular structure and adapted to make contact with the contact means on the bushing while the tubular structure is in the bore, first handle means including first catch means for removing the tubular structure from the bore in the bushing, the first catch means normally retaining the tubular structure against sliding movement in the bushing in the absence of force applied to the first handle means, a connecting rod of conductive material slidably disposed inside the tubular structure, a fuse wire, the end of the connecting rod adjacent the other contact means having one end of the fuse wire connected thereto, the other end of the fuse wire being secured in electrical connection with the other contact means to complete an electrical circuit from the connecting rod to the contact means on the bushing, and second handle means including second catch means secured to the connecting rod, the second catch means normally retaining the connecting rod against sliding movement within the tubular structure in the absence of force applied to the second handle means, the second handle means being adapted to have a pulling force applied thereto for releasing the second catch means and causing the connecting rod to slide and withdraw partially from the tubular structure thereby breaking the fuse wire and interrupting the electrical circuit, the first handle means being adapted to have a pulling force thereafter applied thereto for releasing the tubular structure and permitting the tubular structure and connecting rod to be removed from the bore of the bushing.

11. Fuse and disconnect apparatus according to claim 10 wherein the second handle means includes means covering the first handle means while the electrical circuit through the apparatus is complete and substantially preventing release of the first catch means until the connecting rod has been partially withdrawn and the fuse wire and electrical circuit have been broken.

12. Fuse and disconnect apparatus comprising, in combination, a tubular structure comprising a conductive portion and an insulating portion adapted to be inserted in a bore in a bushing having resilient electrical contact means at one end thereof, other electrical contact means carried on the insulating portion and adapted to engage the resilient contact means, spring biased latch means normally retaining the tubular structure in the bore, handle means for releasing the latch means, conductive connecting rod means including additional spring biased latch means and additional handle means slidably disposed in the tubular structure, a fuse wire connected between the connecting rod means and the contact means carried by the insulating portion, said fuse wire being broken to interrupt the electrical circuit when the additional latch means is released and the connecting rod means partially withdrawn.

13. Fuse and disconnect apparatus according to claim 12 wherein the additional handle means includes guard means covering the first named handle means to prevent the first named handle means from being operated to release the first named latch means until the additional handle means has been operated to withdraw the connecting rod means partially from the tubular structure and break the fuse wire thereby interrupting the electrical circuit.

14. Fuse and disconnect apparatus comprising, in combination, a tubular contact-carrying structure adapted to be slidably inserted in a bore in a bushing having electrical contact means at one end thereof, the contact on the tubular structure being adapted to make electrical connection with the contact means on the bushing, releasable latch means normally retaining the tubular structure in the bore in the bushing, a connecting rod composed of conductive material slidably mounted in the tubular structure, other releasable latch means normally retaining the connecting rod in position in the tubular structure, fuse means extending between the connecting rod and the contact on the tubular structure, handle means connected to the connecting rod and adapted when force is applied thereto to release the other latch means whereby the connecting rod may be partially withdrawn from the tubular structure to break the fuse means thereby interrupting the electrical circuit, and other handle means connected to the tubular structure and adapted when a force is applied thereto in a predetermined direction to release the first named latch means and permit removal of the tubular structure from the bore in the bushing.

15. In fuse and disconnect apparatus, in combination, a high voltage bushing having an axial bore extending the length thereof, the bushing having electrical contact means disposed on one end thereof, a tubular structure composed at least partially of insulating material slidably disposed in the bore in the bushing, the tubular structure having a plurality of axially spaced annular ridges on the outer surface of one end thereof to form ratchets, other contact means mounted on the other end of the tubular structure and normally making electrical connection with the contact means mounted on the bushing, connecting rod means composed of conductive material slidably disposed in the tubular structure, fuse means connected between the connecting rod means and the other contact means, means attached to the connecting rod means for withdrawing the connecting rod means partially from the tubular structure to break the fuse means, latch means secured to the bushing at the end thereof distant from the contact means, the latch means including a pawl normally engaging one of the ratchets and retaining the tubular structure in the bore in the high voltage bushing, key means adapted to move the pawl and release the tubular structure, and means carried by the connecting rod means for preventing the use of the key means to move the pawl until the connecting rod means has been partially withdrawn from the tubular structure and the fuse means broken.

16. In fuse and disconnect apparatus in combination, a tubular structure composed at least partially of insulating material adapted to be slidably disposed in a bore in a bushing composed of insulating material and having contact means at one end thereof, the tubular structure carrying other contact means at one end thereof adapted to make electrical connection with the contact means on the bushing while the tubular structure is in the bore in the bushing, the tubular structure having a plurality of axially spaced annular ridges on the outer surface at the other end thereof to form a ratch, connecting rod means composed of conductive material slidably disposed in the tubular structure, a fuse element extending between the other contact means and the adjacent end of the connecting rod means while the rod means is in a first position, the connecting rod means being adapted to be moved to a second position to break the fuse element, and a releasable pawl normally engaging one of the ridges for retaining the tubular structure and connecting rod means withdrawn in the bore.

17. Fuse and disconnect apparatus according to claim 16 additionally characterized in that upon the tubular structure being reinserted in the bore in the bushing after a new fuse element has been attached, an electrical circuit is not formed between the contact means and the other contact means until the tubular structure has moved far enough into the bore in the bushing so that the pawl engages one of the ridges and the tubular structure is thereby locked in.

18. Fuse and disconnect apparatus according to claim 16 including in addition key means adapted to release the pawl, and means carried by the connecting rod means for preventing the use of the key means to move the pawl until the connecting rod means has been slidably moved to a position which ruptures the fuse element.

19. Fuse and disconnect apparatus according to claim 16 including in addition means carried by the connecting rod means and engaging the tubular structure whereby the connecting rod means and tubular structure may be withdrawn together from the bore in the bushing.

20. Fuse and disconnect apparatus for use with electrical equipment mounted in an enclosed tank at least partially filled with oil, the tank having an aperture therein, comprising in combination, a high voltage bushing adapted to be mounted in the aperture and having a bore extending axially therethrough, the inner end of the bushing extending beneath the oil, a hollow tube disposed around the inner end of the bushing and extending along the outside of the bushing to a position above the oil level in the tank, the tube extending along the inside wall of the bore to a position above the oil level in the bore in the bushing whereby gas in the tank flows through the tube into the bore in the bushing, a tubular structure removably mounted in the bore in the bushing and comprising at least a portion composed of insulating material, contact means carried on the inner end portion of insulating material, other contact means on the bushing normally making electrical connection with the contact means of the tubular structure, releasable latching means operatively connected to the outer end of the tubular structure, a connecting rod of conductive material slidably disposed in the tubular structure and slidable therein from a first position to a second position in response to force applied thereto, and a fuse wire connected to the inner end of the connecting rod and to the contact means on the tubular structure while the connecting rod is in the first position, the connecting rod when moved to the second position breaking the fuse wire thereby interrupting the electrical circuit, the tubular structure having at least one bore through the wall thereof above the adjacent end of the hollow tube whereby gas passes from the hollow tube into the space within the tubular structure between the inner wall thereof and the connecting rod, said space permitting gas entering the bore in the bushing by way of the hollow tube to escape to atmosphere, gas caused by the arc when the fuse wire breaks escaping through the hollow tube into the bore in the bushing and thence to atmosphere, the latching means being adapted to be thereafter released to unlatch the tubular structure, the connecting rod carrying means engaging the tubular structure when the connecting rod is moved to the second position for withdrawing the connecting rod and tubular structure as a unit from the bore in the high voltage bushing after the latching means is unlatched.

21. Fuse and disconnect apparatus according to claim 20 in which the bushing is additionally characterized as having an axial groove in the wall in the bore therein communicating between the inner end of the hollow tube and said bore through the wall of the tubular structure to facilitate the flow of gas.

22. Fuse and disconnect apparatus according to claim 20 wherein the releasable latching means for the tubular structure includes a plurality of axially spaced annular ridges forming ratch surfaces on the outside of the tubular structure, and a movable pawl secured to the bushing, the pawl normally engaging one ratch surface and retaining the tubular structure in the bore in the bushing, the pawl being adapted to be released by key means, the tubular structure upon being reinserted in the bore in the bushing after a new fuse wire has been attached not resulting in an electrical circuit between the contact means and the other contact means until the tubular structure has moved far enough into the bore in the bushing so that the pawl engages one of the annular ridges and locks the tubular structure in the bore in the bushing.

References Cited
UNITED STATES PATENTS

| | | | |
|---|---|---|---|
| 1,393,344 | 10/1921 | Conrad. | |
| 1,857,322 | 5/1932 | Nordhem | 200—117 |
| 2,246,193 | 6/1941 | Smith | 200—117 |
| 2,310,466 | 2/1943 | Schultz et al. | 200—114 |
| 2,331,778 | 10/1943 | Hill | 200—117 XR |
| 2,677,738 | 5/1954 | Schneider | 200—114 |
| 2,835,764 | 5/1958 | Earle | 200—114 |

BERNARD A. GILHEANY, *Primary Examiner.*

R. N. ENVALL, JR., *Assistant Examiner.*

U.S. Cl. X.R.

337—148, 150